(12) United States Patent
Tian et al.

(10) Patent No.: US 7,805,301 B2
(45) Date of Patent: Sep. 28, 2010

(54) COVARIANCE ESTIMATION FOR PATTERN RECOGNITION

(75) Inventors: Ye Tian, Beijing (CN); Frank Kao-Ping Soong, Beijing (CN); Jian-Lai Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 11/173,907

(22) Filed: Jul. 1, 2005

(65) Prior Publication Data

US 2007/0005355 A1    Jan. 4, 2007

(51) Int. Cl.
*G10L 15/14*    (2006.01)

(52) U.S. Cl. .................... 704/256.2; 704/237; 704/245; 704/256.7

(58) Field of Classification Search ................ 704/270, 704/246, 256, 240, 239, 237, 243, 245, 256.2, 704/256.7; 382/228
See application file for complete search history.

(56) References Cited

U.S. PATENT DOCUMENTS

| | | | | |
|---|---|---|---|---|
| 5,299,144 | A * | 3/1994 | Bartkowiak et al. ......... | 708/200 |
| 5,787,394 | A * | 7/1998 | Bahl et al. .................. | 704/238 |
| 5,857,169 | A * | 1/1999 | Seide ....................... | 704/256.7 |
| 5,912,989 | A * | 6/1999 | Watanabe ................... | 382/228 |
| 5,946,656 | A * | 8/1999 | Rahim et al. ............. | 704/256.2 |
| 6,317,712 | B1 * | 11/2001 | Kao et al. ................. | 704/256.3 |
| 6,324,510 | B1 * | 11/2001 | Waibel et al. ............. | 704/256.7 |
| 6,751,590 | B1 * | 6/2004 | Chaudhari et al. ........ | 704/246 |
| 2002/0152069 | A1 * | 10/2002 | Gao et al. .................. | 704/240 |
| 2003/0018475 | A1 * | 1/2003 | Basu et al. .................. | 704/270 |
| 2003/0099401 | A1 * | 5/2003 | Driggs et al. ............... | 382/228 |
| 2003/0144839 | A1 * | 7/2003 | Dharanipragada et al. .. | 704/246 |
| 2003/0216914 | A1 * | 11/2003 | Droppo et al. ............. | 704/240 |
| 2004/0019483 | A1 * | 1/2004 | Deng et al. ................. | 704/239 |

OTHER PUBLICATIONS

"Supervised and unsupervised learning in radial basis function classifiers", L. Tarassenko, S. Roberts. Aug. 1994.*
"Training of Across-Word Phoneme Models for Large Vocabulary Continuous Speech Recognition", A. Sixtus, H. Ney. Jan. 2003.*
Hui Lin, Ye Tian, Jian-Lai Zhou, Hui Jiang, "Hierarchical correlation compensation for hidden markov models," Submitted to Proc. ICASSP2005. Publication Date: Mar. 18-23, 2005.*
Xi Zhou, Ye Tian, Jian-Iai Zhou, Bei-qian Dai, "Improved Covariance Modeling for Maximum Likelihood Multiple Subspace Transformations" Submitted to Proc. ICASSP2005.*
Robust decision tree state tying for continuous speech recognition , Reichl, W.; Wu Chou Speech and Audio Processing, IEEE Transactions on On pp. 555-566, vol. 8, Issue: 5, Sep. 2000.*

(Continued)

*Primary Examiner*—Talivaldis Ivars Smits
*Assistant Examiner*—Greg A Borsetti
(74) *Attorney, Agent, or Firm*—Joseph R. Kelly; Westman, Champlin & Kelly, P.A.

(57) ABSTRACT

A reliable full covariance matrix estimation algorithm for pattern unit's state output distribution in pattern recognition system is discussed. An intermediate hierarchical tree structure is built to relate models for product units. Full covariance matrices of pattern unit's state output distribution are estimated based on all the related nodes in the tree.

8 Claims, 5 Drawing Sheets

OTHER PUBLICATIONS

H. J. Nock, M. J. E Gales, S. Young, "A Comparative Study of Methods for Phonetic Decision-Tree State Clustering,", Proc. Europ. Con$ on Speech Communication and Technology, Rhodes, Greece, pp. 11 1-1 14, Sep. 1997.*

M. Gales and P. Woodland, "Mean and variance adaptation within the MLLR framework," Comput. Speech Lang., vol. 10, pp. 250-264, Oct. 1996.*

T. Watanabe, K. Shinoda, K. Takagi, and K.-I. Iso, "High speed speech recognition using tree-structured probability density function," in Proc. Int. Conf. Acoustics, Speech, Signal Processing, 1995.*

Young, S. J., Odell, J. J. & Woodland, P. C. (1994). Tree-based state tying for high accuracy acoustic modelling. Proceedings of the ARPA Human Language Technology Workshop, Morgan Kaufmann, Princeton NJ, pp. 307-312.*

T. Watanabe, K. Shinoda, K. Takagi, and E. Yamada, "Speech recognition using tree-structured probability density function," in Proc. Int. Conf. Speech Language Processing '94, 1994, pp. 223-226.*

M. J. F. Gales, The generation and use of regression class trees for MLLR adaptation: Cambridge University, 1996.*

J. T Chien, "Online hierarchical transformation of hidden Markov models for speech recognition," IEEE Trans. Speech Audio Processing, vol. 7, pp. 656-667, Jun. 1999.*

A. Ljolije, *The importance of cepstral parameter correlation in speech recognition*, Comput. Speech Lang., vol. 8, pp. 223-232, 1994.

S.B. Davis and P. Mermelstein, *Comparison of parametric representations for monosyllabic word recognition in continuously spoken sentences*, IEEE Trans. Acoust., Speech, Signal Processing, vol. 28, pp. 357, 1980.

Haeb-Umbach, R.; Ney, H.; *Linear discriminant analysis for improved large vocabulary continuous speech recognition*, in Proc. ICASSP-92.

R.A. Gopinath. *Maximum likelihood modeling with Gaussian distributions for classification* in Proc. ICASSP'98.

N. Kumar, *Investigation of silicon-auditory models and generalization of linear discriminant analysis for improved speech recognition*, Ph.D. dissertation, Johns Hopkins Univ., Baltimore, MD, 1997.

M.J.F. Gales, *Semi-tied covariance matrices for hidden Markov models*, IEEE Trans. Speech Audio Processing, vol. 7, pp. 272-281, 1999.

M.J.F. Gales, *Maximum Likelihood Multiple Subspace Projections for Hidden Markov Models*, IEEE Trans. Speech Audio Processing, vol. 10, pp. 37-47, 2002.

Vanhoucke, V.; Sankar, A.; *Mixtures of inverse covariance*, IEEE Trans. Speech Audio Processing, vol. 12, pp. 250-264, May 2004.

S. Axelrod, R. Gopinath, and P. Olsen, *Modeling with a subspace constraint on inverse Covariance matrices*, in Proc. ICSLP 2002.

Olsen, P.A.; Gopinath, R.A., *Modeling inverse covariance matrices by basis expansion*, IEEE Trans. Speech and Audio Processing, vol. 12, pp. 37-46, Jan. 2004.

Shinoda, K.; Lee, C.-H.; *A structural Bayes approach to speaker adaptation*, IEEE Trans. Speech and Audio Processing, vol. 9, pp. 276-287, Mar. 2001.

E. Chang, Y.Shi, J. Zhou, and C. Huang, *Speech lab in a box: A Mandarin speech toolbox to jumpstart speech related research toolbox*, in Proc. Eurospeech 2001.

Olsen, P.A. and Gopinth, R.A., *Modeling inverse covariance matrices by basis expansion*, IEEE Trans. Speech and Audio Processing, vol. 12, pp. 37-46, Jan. 2004.

* cited by examiner

COVARIANCE ESTIMATION FOR PATTERN RECOGNITION

BACKGROUND

The discussion below is merely provided for general background information and is not intended to be used as an aid in determining the scope of the claimed subject matter.

A pattern recognition system, such as a speech recognition system or a handwriting recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many pattern recognition systems need to build models to parameterize each pattern unit. These units can be phonemes or words for speech recognition and characters for handwriting recognition. Hidden Markov Models (HMM) are widely used for pattern recognition systems in which patterns have time sequence information. In HMM, each pattern contains several states and several arcs among these states. During the training stage, probability distributions for occupying the states and for transitioning between states are determined for each of the units. During the decoding stage, a signal is compared to the distributions for the states to identify a most likely sequence of HMM states that can be represented by the input signal.

In HMM, state distributions are often approximated by mixtures of Gaussian distributions. Each Gaussian distribution component is determined by mean vector and covariance matrix. There are generally two approaches for estimating covariance matrix: diagonal covariance matrix and full covariance matrix.

Full covariance matrix models correlations between feature components of the model, which improves pattern recognition accuracy. However, for large scale pattern recognition such as speech recognition and handwriting recognition, the number of full covariance parameters is several orders of magnitude greater than the number of mean parameters. The dramatic increase of parameters will cause the full covariance to not be reliably estimated, or even singular. A singular covariance matrix can not be used for pattern recognition because a likelihood calculation uses the inverse of a covariance matrix.

Diagonal covariance is currently widely used, but, in this case, the feature components are assumed to be independent with each other. This assumption can lead to reduced pattern recognition accuracy. Accordingly, both diagonal covariance matrix and full covariance matrix has its own defect.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A full covariance matrix estimation algorithm for a pattern unit's state output distribution in a pattern recognition system is discussed. An intermediate hierarchical tree structure is built to relate all the models for pattern units. Full covariance matrices of pattern unit's state output distribution are estimated based on all the related nodes in the tree.

DETAILED DESCRIPTION

Figure 1:
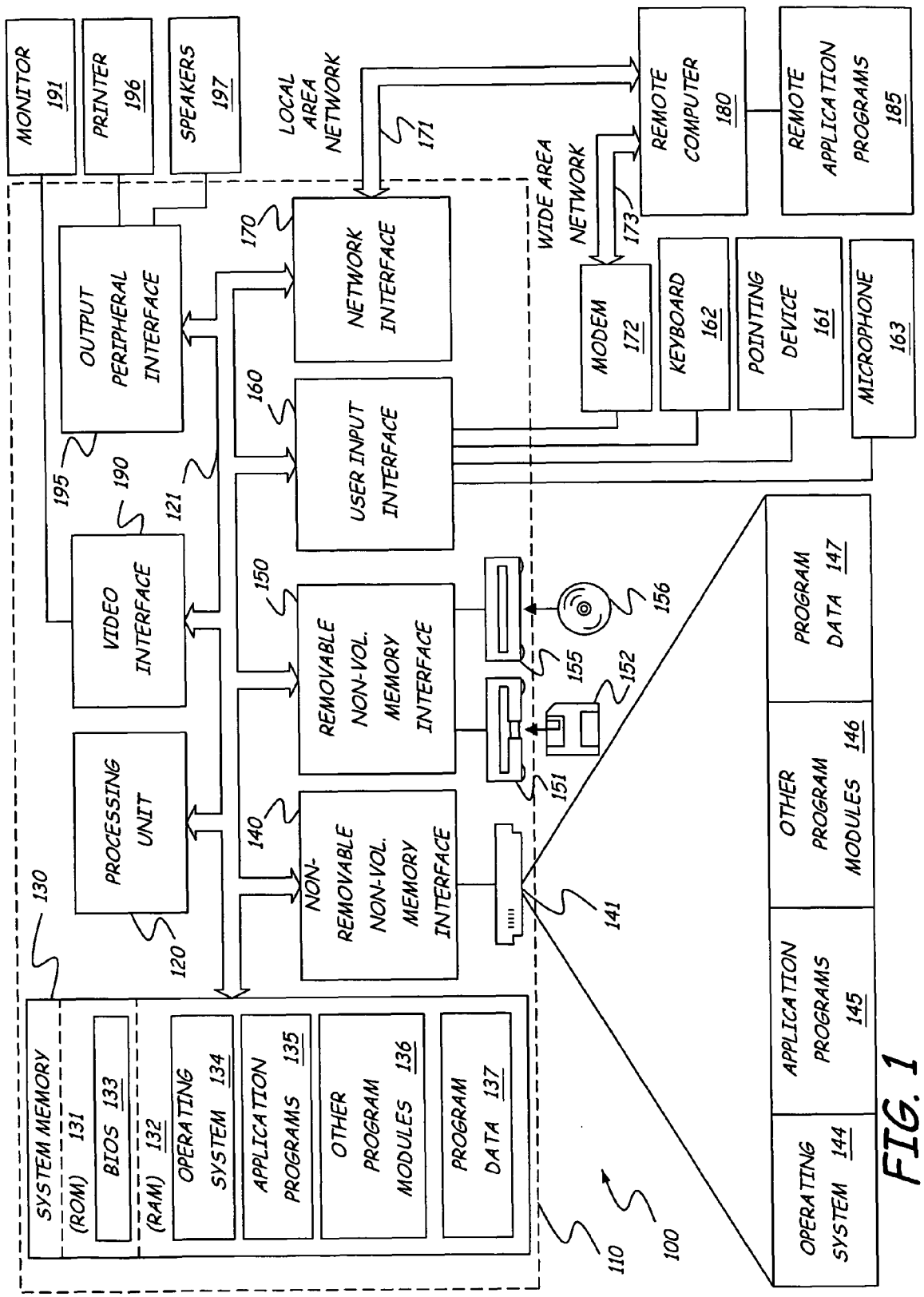
FIG. 1 is a block diagram of a computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the'system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
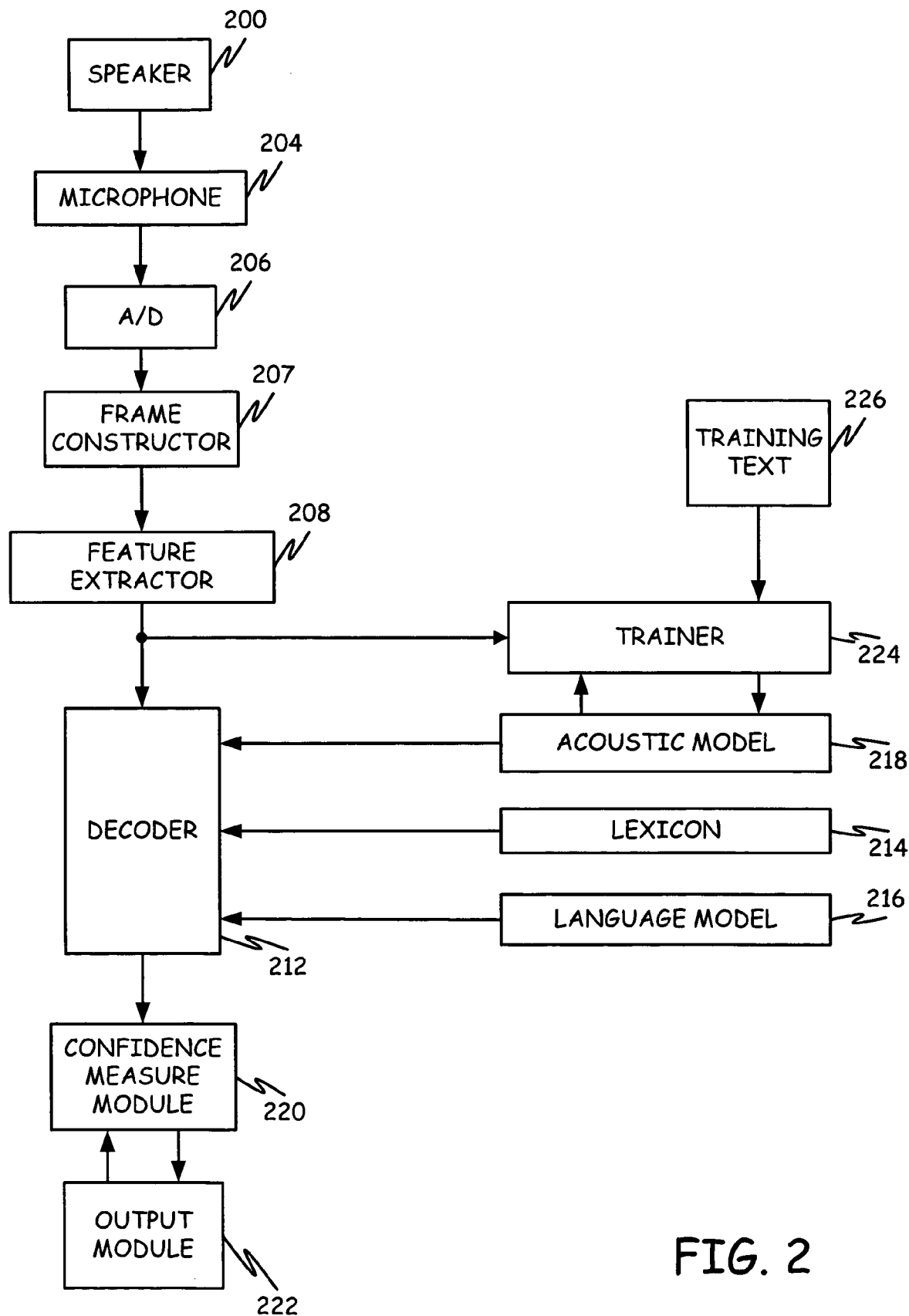
FIG. 2 is a block diagram of a speech recognition system.

FIG. 2 provides a block diagram of a speech recognition system 200. In FIG. 2, a speaker 202, either a trainer or a user, speaks into a microphone 204. The audio signals detected by microphone 204 are converted into electrical signals that are provided to analog-to-digital converter 206.

A-to-D converter 206 converts the analog signal from microphone 204 into a series of digital values. In several embodiments, A-to-D converter 206 samples the analog signal at 16 kHz and each sample is quantitated to 16 bits, thereby creating 32 kilobytes of speech data per second. These digital values are provided to a frame constructor 207, which, in one embodiment, groups the values into 25 millisecond frames that start 10 milliseconds apart. It is worth noting that frame constructor 207 is not limited to these special parameters.

The frames of data created by frame constructor 207 are provided to feature extractor 208, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that system 200 is not limited to these feature extraction modules and that other modules may be used within the context of system 200.

The feature extraction module 208 produces a stream of feature vectors that are each associated with a frame of the speech signal. This stream of feature vectors is provided to a decoder 212, which identifies a most likely sequence of words based on the stream of feature vectors, a lexicon 214, a language model 216 (for example, based on an N-gram, context-free grammars, or hybrids thereof), and the acoustic model 218.

The most probable sequence of hypothesis words is provided to a confidence measure module 220. Confidence measure module 220 identifies which words are most likely to have been improperly identified by the speech recognizer, based in part on a secondary acoustic model (not shown). Confidence measure module 220 then provides the sequence of hypothesis words to an output module 222 along with identifiers indicating which words may have been improperly identified. Those skilled in the art will recognize that confidence measure module 220 is not necessary for the operation of system 200.

Acoustic model 218 can be Hidden Markov Model consisting of a set of hidden states. Each linguistic unit represented by the model consists of a subset of these states. For example, in one embodiment, each phoneme is constructed of three interconnected states. Each state has an associated set of probability distributions that in combination allow efficient computation of the likelihoods against any arbitrary sequence of input feature vectors for each sequence of linguistic units (such as words). The model also includes probabilities for transitioning between two neighboring model states as well as allowed transitions between states for particular linguistic units. By selecting the states that provide the highest combination of matching probabilities and transition probabilities for the input feature vectors, the model is able to assign linguistic units to the speech. For example, if a phoneme was constructed of states 0, 1 and 2 and if the first three frames of speech matched state 0, the next two matched state 1 and the next three matched state 2, the model would assign the phoneme to these eight frames of speech.

During training, a speech signal corresponding to training text 226 is input to decoder 212, along with a lexical transcription of the training text 226. Trainer 224 trains acoustic model 218 based on the training inputs. The subject matter described herein relates to developing hidden markov models for processing of information. Acoustic model 218 is intended to be one example implementation of a hidden markov model. Other types of pattern recognition systems can utilize the subject matter described herein, namely handwriting recognition systems.

Figure 3:
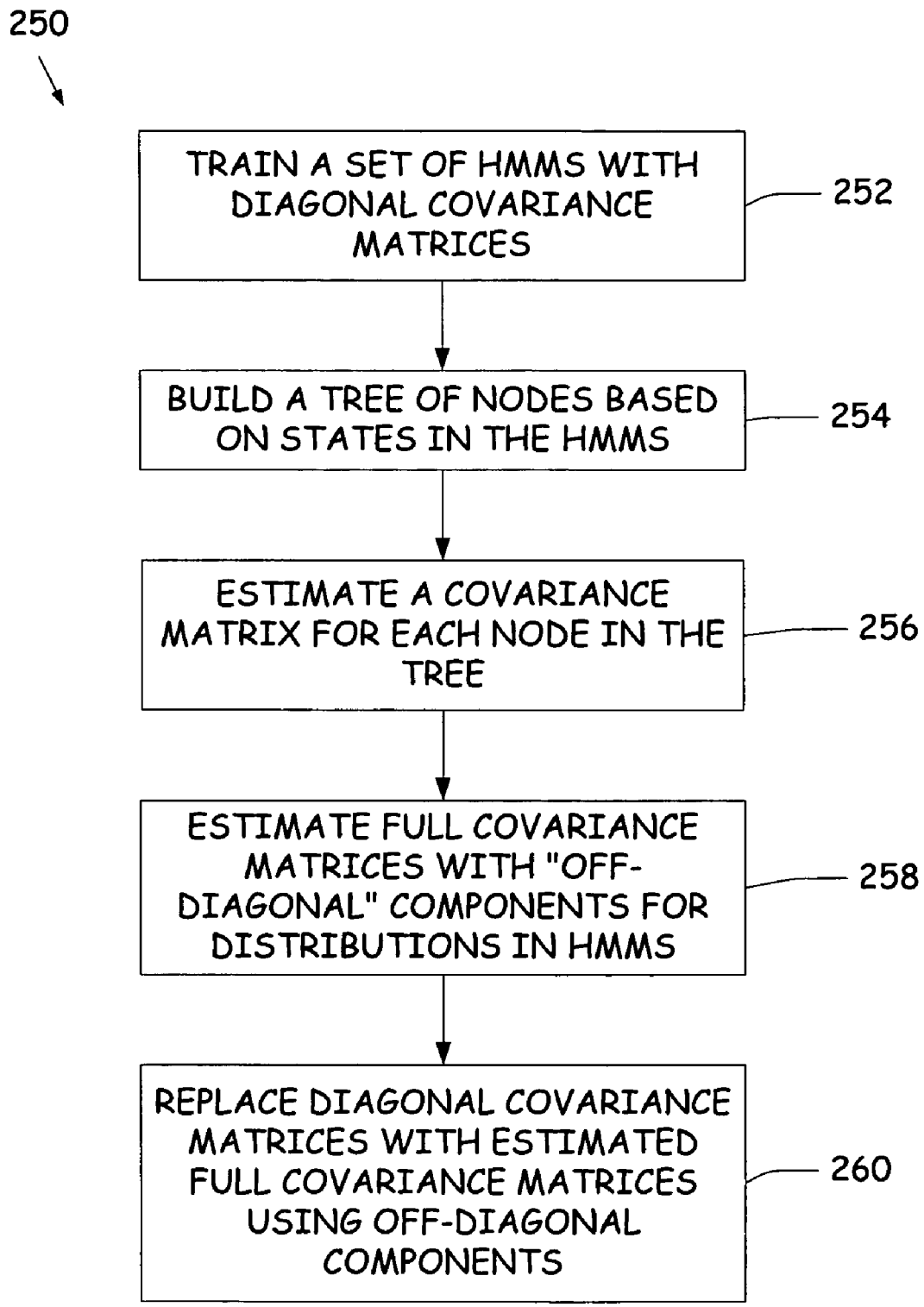
FIG. 3 is a flow diagram of a method for compensating for a difference between a diagonal covariance matrix and a full covariance matrix.

FIG. 3 is a flow diagram of a method 250 for estimating full covariance matrices for HMM states. Method 250 includes building a diagonal covariance matrix HMM, setting up an intermediate hierarchical tree, and compensating the difference between diagonal covariance matrix and full covariance matrix for all mixture components of pattern unit's state. At step 252, a set of HMM models are trained with diagonal covariance matrices. For example, a baseline model set of tri-phone HMMs with diagonal covariance matrices can be trained for speech recognition. A mean and a covariance for each model can be based on maximum likelihood (ML) criterion. The states of the models are then used to build a hierarchical tree at step 254. There are various approaches that can be used to build the tree. In one approach, states can be tied together using a state tying process. For example, in speech recognition, all the states are used to build a tree. The tree can be built according to a full covariance's Kullback-Liebler (KL) distance with top-down clustering or using a decision tree generated from model training step 252. After the state tree is built, Gaussian components for each state node are expanded as another layer of a child for the node.

A full covariance matrix for each node in the tree is estimated at step 256. The full covariance matrix is estimated from all of its child nodes. At step 258, for each state Gaussian component in the HMM, the estimated full covariance matrices of all the nodes along an upward path from the Gaussian component node to the root of the tree are used to estimate off-diagonal parameters in full covariance matrix of the Gaussian component. One kind of possible estimation is a linear combination scheme, where combination weights are estimated by maximum likelihood criterion. Non-linear combination can also be used here. The diagonal covariance matrices of Gaussian components in the model set trained in step 252 are replaced with the newly estimated full covariance matrices at step 260. The resultant model set is used for pattern recognition.

Hierarchical Tree Building

To build a tree in step 254, states are used as basic elements in a baseline model. One approach to build the tree is to use the covariance matrices' KL distance measure to perform top-down matrix clustering. Another approach is to derive the tree from decision trees generated in model training step 252.

Top-Down Covariance Matrix Clustering

Figure 4:
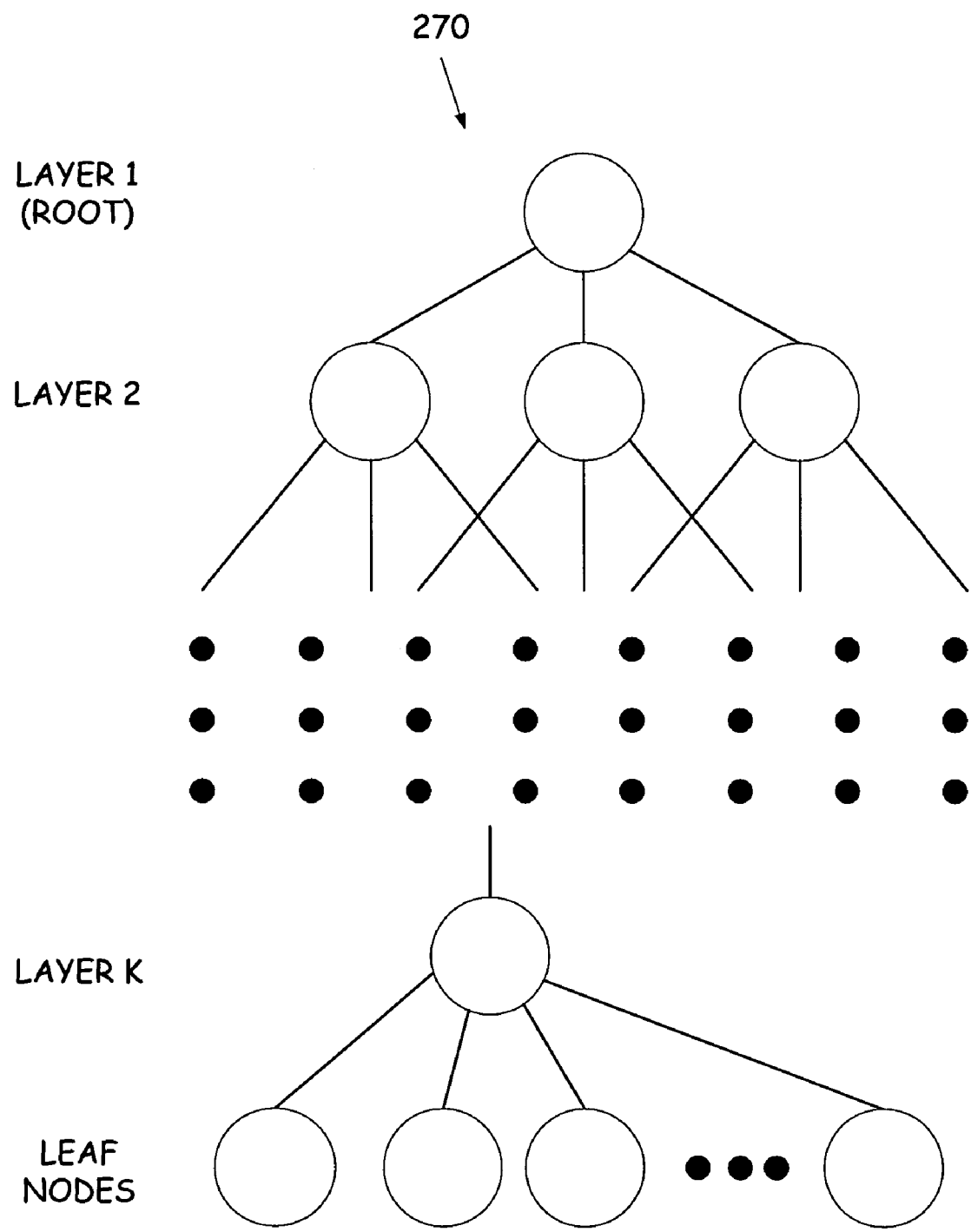
FIG. 4 is a diagram of a tree structure of states in a model generated by top-down clustering.

FIG. 4 is a tree 270 developed using top-down matrix clustering. It will be appreciated that bottom up clustering can also be used. The tree 270 includes layers 1-K plus a layer of leaf nodes. The leaf nodes represent Gaussian components. The layer K is HMM state layer. In training step 252, a maximum likelihood process is used to estimate mean vectors and full covariance matrices of each Gaussian component. The mean of the m'th Gaussian component $\mu_m$ is:

$$\mu_m = \frac{\sum_\tau \gamma_m(\tau) o(\tau)}{\sum_\tau \gamma_m(\tau)} \quad (1)$$

The full covariance matrix of the m'th Gaussian component $\Sigma_m$ is:

$$\sum\nolimits_m = \frac{\sum_\tau \gamma_m(\tau)(o(\tau) - \mu_m)(o(\tau) - \mu_m)^\tau}{\sum_\tau \gamma_m(\tau)} \quad (2)$$

where $o(\tau)$ is the $\tau^{th}$ observation vector, $\gamma_m(\tau)$ is the probability that $o(\tau)$ belongs to the m-th Gaussian component.

The m'th component's weight $\omega_m$ can be expressed as:

$$\omega_m = \sum_\tau \gamma_m(\tau) \qquad (3)$$

Given the states, the full covariance matrix of the i th state is estimated from all of its child nodes as:

$$\sum_i = \frac{\sum_{\{m \in ith\ state\}} \omega_m \sum_m}{\sum_{\{m \in ith\ state\}} \omega_m} \qquad (4)$$

The weight of i th state node is:

$$\omega_{state,i} = \sum_{m \in ith\ state} \omega_m \qquad (5)$$

The state nodes are used to perform top-down clustering. In clustering, distance measure can be used to calculate a distance between two Gaussians and a center for each new cluster can be computed. The distance measure between two Gaussian densities $g_m(x)=N(x;\mu_m;\Sigma_m^{-1})$ and $g_n(x)=N(x;\mu_n;\Sigma_m^{-1})$ can be defined as the sum of the Kullback-Leibler (KL) divergence from $g_m(x)$ to $g_n(x)$ and from $g_n(x)$ to $g_m(x)$. That is:

$$d(m,n) = Tr\left(\sum_m^{-1}\sum_n + \sum_n^{-1}\sum_m\right) + (\mu_n-\mu_m)^T \sum_m^{-1}(\mu_n-\mu_m) + (\mu_m-\mu_n)^T \sum_n^{-1}(\mu_m-\mu_n) \qquad (6)$$

Since only the covariance is of interest, the distance between the Gaussian means can be ignored. Eventually, the following formula can be used to calculate the distance between two covariance matrices:

$$d(m,n)=Tr(\Sigma_m^{-1}\Sigma_n+\Sigma_n^{-1}\Sigma_m) \qquad (7)$$

Next, for each intermediate node k in the tree, a full covariance matrix is calculated from all states belonging to the node k as:

$$\sum_{node,k} = \frac{\sum_{i \in G(k)}\left[\omega_{state,i}\sum_{state,i}\right]}{\sum_{i \in G(k)} \omega_{state,i}} \qquad (8)$$

where G(k) is the set of all the elements belonging to node k. $\omega_{state,i}$ and $\Sigma_{state,i}$ are the weight and the full covariance matrix of state respectively.

Based on the distance measure in Eq. (7) and new center calculation in Eq. (8), a standard top-down clustering approach can be used to build the tree and expand each state in a leaf node with all its Gaussian components.

Phonetic Decision Tree Based Tree Building

Figure 5:
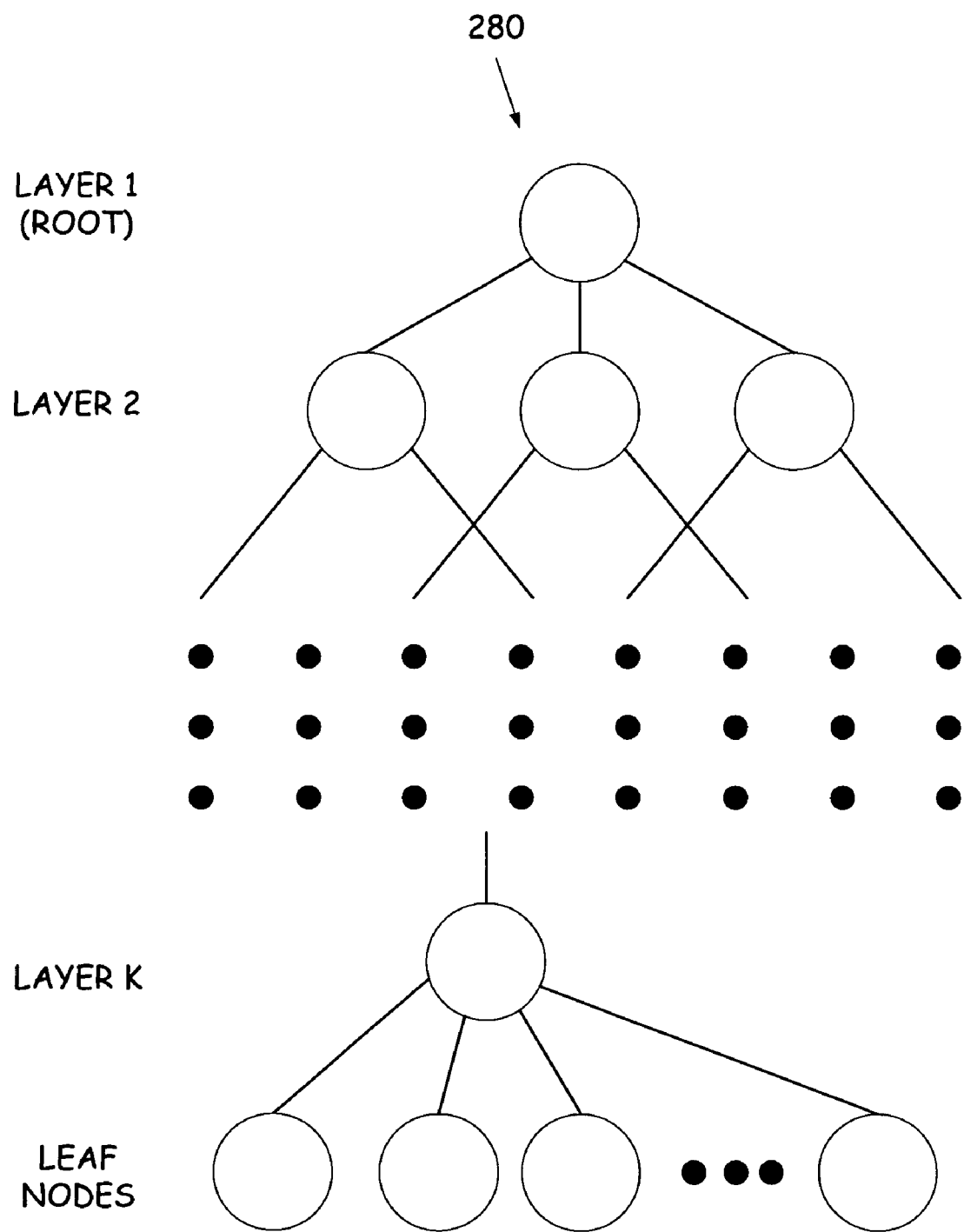
FIG. 5 is a diagram of a tree structure of states in a model generated by decision trees.

FIG. 5 is a diagram of a tree 280 generated from decision trees. Tree 280 includes a root layer and layers 2-K plus a leaf node layer. Layers 2-K are based on decision trees where layer 2 is a set of monophone clusters. The leaf nodes represent Gaussian components. The layer K is HMM state layer. Different from the previous top-down clustering tree, data in this approach is initially divided into monophone clusters. Then, each monophone's node is expanded with corresponding phonetic decision trees generated in model training for monophone. The leaf nodes, up to this point, are all states. Then, each leaf node is expanded with all its Gaussian components as another layer of child nodes. The full covariance matrix of each intermediate node is estimated based on Eq. (8).

Hierarchical Correlation Compensation

In the models generated at step 252, all diagonal parameters of full covariance of Gaussian components in covariance matrices are already estimated reliably. Only the off-diagonal parameters of full covariance of Gaussian components need to be be compensated. For each Gaussian component, nodes along an upward path to the root are used to estimate the off-diagonal parameters for the Gaussian component based on a linear combination strategy. Linear combination weights are estimated by maximum likelihood criterion. Non-linear combination can also be used.

Linear Combination

Assume a Gaussian component in the i th leaf node, all intermediate nodes along the upward path from this node to the root is defined as the set:

$$\Psi(i) = \left\{\begin{array}{c} i\text{'s parent, }i\text{'s parent's parent,} \\ \ldots, \ldots, \text{root} \end{array}\right\} \qquad (9)$$

Thus, the new full covariance $\hat{\Sigma}_i$ of the i th Gaussian component can be estimated by:

$$\hat{\sum}_i = diag(\sum_i) + \sum_{m \in \Psi(i)} \lambda_{i,m}\left[\sum_{node,m} - diag(\sum_{node,m})\right] \qquad (10)$$

where $diag(\Sigma_i)$ is the diagonal matrix of $\Sigma_i$ and $\lambda_{i,m}$ are combination weights to be estimated.

Weight Estimation

The linear combination weights $\lambda_{i,m}$ are estimated to maximize the likelihood function of data belonging to this Gaussian component. The Expectation Maximization (EM) algorithm can be used. An auxiliary function in the EM algorithm can be written as $$Q\left(\sum,\hat{\sum}\right) = \sum_{i=1}^{M} \omega\left[\log\left|\hat{\sum}_i^{-1}\right| - Tr\left(\hat{\sum}_i^{-1}\sum_i\right)\right], \qquad (11)$$

where $\omega_i$ is the component's weight defined in Eq. (3). $\Sigma_i$ is the i th component's full covariance estimated as in Eq. (2). $\hat{\Sigma}_i$ is the new full covariance matrix to be estimated as in Eq. (10), where only the weights $\lambda_{i,m}$ are unknown. M is the total number of Gaussian components in the model set.

For each Gaussian component i, the weights $\lambda^{(i)}$ are independent from other Gaussian components. Hence the optimization problem of the whole model can be decomposed into M small optimization problems. That is, for i=1, 2, ... M, optimizing $$Q(\Sigma_i, \hat{\Sigma}_i) = \omega_i \left[ \log|\hat{\Sigma}_i^{-1}| - Tr(\hat{\Sigma}_i^{-1}\Sigma_i) \right] \quad (12)$$

A numerical method, for example the Davidon-Fletcher-Powell (DFP) algorithm, can be used to maximize the Q function with respect to weights $\lambda_{i,m}$. Other methods such as non-linear numeric optimization can also be used to estimate the combination weights.

Our speech recognition experiment results shows an significant error reduction over the standard model with diagonal covariance matrices can be achieved using our approach.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of developing a pattern recognition model, the method comprising:
    training, using a processor, a plurality of models for the pattern recognition model with diagonal covariance matrices, each model comprising a continuous density hidden Markov Model;
    building, using a processor, a covariance hierarchical tree structure of states from the plurality of models wherein the covariance hierarchical tree structure includes a root node and children nodes associated with the root node, and a plurality of leaf nodes, each leaf node representing a Gaussian component of the continuous density hidden Markov Models;
    generating, using a processor, a diagonal covariance matrix for the root node and children nodes prior to a leaf node, without estimating a full covariance matrix;
    creating, using a processor, a full covariance matrix for each leaf node in the hierarchical tree structure for each of the plurality of models by estimating terms of the full covariance matrix based on related models using the hierarchical tree structure and wherein creating the full covariance matrix for each leaf node includes linearly combining the generated diagonal covariance matrices for the nodes along an upward path from a given leaf node to the root node, using a set of combination weights, to estimate off diagonal components of the full covariance matrix for the given leaf node;
    replacing, using a processor, the diagonal covariance matrices of the leaf nodes in the plurality of models with the full covariance matrices to modify the pattern recognition model; and
    storing, using a processor, the pattern recognition model on a non-transitory storage medium for use in a pattern recognition system.

2. The computer-implemented method of claim 1 wherein building the hierarchical tree structure includes using one of a top-down and bottom-up covariance matrix clustering process.

3. The computer-implemented method of claim 1 wherein building the hierarchical tree structure includes using a decision tree based building process.

4. The computer-implemented method of claim 1 wherein creating the full covariance matrix includes only compensating off-diagonal parameters of the full covariance matrix of each model.

5. The computer-implemented method of claim 1 wherein the combination weights are estimated using maximum likelihood criterion.

6. The computer-implemented method of claim 1 wherein the combination weights are estimated using one of non-linear numeric optimization and an expectation maximization algorithm.

7. A computer-implemented method of developing a pattern recognition model, comprising:
    building, using a processor, a hierarchical tree structure of states from a plurality of models with diagonal covariance matrices, wherein the tree structure includes a root node, a plurality of middle nodes, and a plurality of leaf nodes, each leaf node representing a probability component;
    creating, using a processor, a diagonal covariance matrix for the root node and the plurality of middle nodes without creating a full covariance matrix for the root node and the plurality of middle nodes;
    creating, using a processor, a full covariance matrix for each leaf node based on an upward path identified for each leaf node including the root node and the at least one middle node, wherein creating a full covariance matrix for each leaf node includes using combination weights to estimate terms for the full covariance matrix for each leaf node based on related nodes in the tree wherein creating a full covariance matrix for each leaf node comprises estimating off-diagonal parameters for each leaf node based on estimated diagonal covariance matrices of the nodes identified on the upward path, including the root node and the at least one middle node;
    replacing, using a processor, diagonal covariance matrices in the pattern recognition model with the estimated full covariance matrices for the plurality of leaf nodes; and
    storing, using a processor, the pattern recognition model on a non-transitory storage medium, wherein the pattern recognition model is configured for use in a pattern recognition system.

8. The computer-implemented method of claim 7, wherein the combination weights are estimated using linear combination and maximum likelihood criterion.

* * * * *